US012627012B2

(12) United States Patent
Singh et al.

(10) Patent No.: US 12,627,012 B2
(45) Date of Patent: May 12, 2026

(54) THERMAL RUNAWAY PREVENTION

(71) Applicant: Relyion Energy Inc., Fremont, CA (US)

(72) Inventors: Surinder Singh, Fremont, CA (US); Ratnesh K. Sharma, Fremont, CA (US)

(73) Assignee: Relyion Energy Inc., Fremont, CA (US)

( * ) Notice: Subject to any disclaimer, the term of this patent is extended or adjusted under 35 U.S.C. 154(b) by 674 days.

(21) Appl. No.: 18/048,641

(22) Filed: Oct. 21, 2022

(65) Prior Publication Data

US 2024/0136607 A1 Apr. 25, 2024
US 2024/0234844 A9 Jul. 11, 2024

(51) Int. Cl.
*H01M 50/581* (2021.01)
*H01H 85/06* (2006.01)

(52) U.S. Cl.
CPC .......... *H01M 50/581* (2021.01); *H01H 85/06* (2013.01); *H01M 2200/103* (2013.01)

(58) Field of Classification Search
None
See application file for complete search history.

(56) References Cited

U.S. PATENT DOCUMENTS 9,537,184 B2 * 1/2017 Takahashi .......... H01M 50/583
10,116,008 B1 * 10/2018 Hsu ..................... H01M 50/581

| | | | | |
|---|---|---|---|---|
| 2005/0197003 A1* | 9/2005 | Yokoyama | .......... | H01M 50/213 |
| | | | | 439/500 |
| 2019/0319248 A1* | 10/2019 | Sawatzki | ............ | H01M 50/264 |
| 2019/0393477 A1* | 12/2019 | Lawrence | .............. | H01H 39/00 |
| 2022/0158149 A1* | 5/2022 | Schwarzwalder | .. | H01M 10/617 |
| 2023/0223665 A1* | 7/2023 | Fan | ..................... | H01M 10/052 |
| | | | | 429/61 |
| 2023/0335871 A1* | 10/2023 | Park | ..................... | H01M 50/566 |
| 2025/0007132 A1* | 1/2025 | Kastler | ............... | H01M 50/213 |

FOREIGN PATENT DOCUMENTS

| | | | | | |
|---|---|---|---|---|---|
| KR | 20170034497 A | * | 3/2017 | .......... | H01M 10/425 |
| KR | 20210131103 A | * | 11/2021 | ............... | G01K 7/02 |

* cited by examiner

*Primary Examiner* — Scott J. Chmielecki

(74) *Attorney, Agent, or Firm* — Morrison & Foerster LLP

(57) ABSTRACT

A battery assembly can include a pair of batteries. The battery pair may be electrically coupled by a bimetallic strip. When the temperature of the battery assembly exceeds a threshold temperature, the bimetallic strip deforms so that the coupling between the first and second batteries breaks. In other cases, the battery pair may be coupled by a spring-loaded connector. A sacrificial block configured to melt if the temperature of the battery assembly increases beyond the threshold temperature may force the spring into an energy-storing configuration. When the sacrificial block melts, the spring is released, and the connector is forced in a direction away from the battery terminals. Finally, the battery assembly may include a thermopile and one or more relays. When a temperature gradient of the thermopile exceeds a threshold gradient, the thermopile generates a voltage that causes the relays to disconnect the battery assembly from a charging circuit.

14 Claims, 10 Drawing Sheets

THERMAL RUNAWAY PREVENTION

FIELD

The present disclosure relates generally to systems for preventing thermal runway.

BACKGROUND

Thermal runaway is a well-known problem for battery assemblies. Many thermal runaway solutions involve complex cooling or fire prevention systems that are electronically controlled by a battery management system (BMS).

SUMMARY

As described above, many thermal runaway solutions involve complex cooling or fire prevention systems that are electronically controlled by a battery management system (BMS). Controlling the cooling or fire prevention systems requires the BMS to continuously extract data from the batteries in the battery assembly and process said data to detect anomalies. In other words, the prevention of thermal runaway is contingent upon the ability of the BMS to accurately and efficiently determine when thermal runway is occurring. Monitoring and analysis by a BMS system introduces the potential for failures due to inaccurate measurements, non-optimal control logic, slow response times, and/or other failures by the BMS system.

Accordingly, there is a need for improved systems and methods for preventing thermal runaway in battery assemblies, including for systems and methods that allow prevention of thermal runaway without the need for reliance on electronic monitoring and control by a BMS system. Disclosed herein are systems and methods that may address one or more of the above-identified needs.

Provided herein are battery assemblies with thermal runaway prevention mechanisms. The thermal runaway prevention mechanisms may include analog systems that are configured to prevent thermal runaway in battery assemblies without the aid of an electronic monitoring system such as a battery management system. In particular, the battery assemblies may be configured to break electrical coupling between two or more batteries or between a battery and another circuit when a temperature of the battery assembly exceeds a threshold temperature value.

A first battery assembly may comprise a first battery comprising a first terminal, a second battery comprising a second terminal, a conductive connector electrically coupled the second terminal, and a bimetallic strip electrically coupled to the first terminal and to the conductive connector, wherein the bimetallic strip is configured to deform as a temperature of the bimetallic strip changes, such that deformation of the bimetallic strip will cause the bimetallic strip to disconnect from the conductive connector when the temperature of the bimetallic strip exceeds a first threshold temperature value.

In some embodiments of the first battery assembly, the first battery and the second battery are rechargeable.

In some embodiments of the first battery assembly, the conductive connector comprises copper.

In some embodiments of the first battery assembly, the bimetallic strip comprises a first layer comprising steel and a second layer comprising copper.

In some embodiments of the first battery assembly, wherein the first threshold temperature value is greater than or equal to 50° C. and less than or equal to 100° C.

In some embodiments of the first battery assembly, deformation of the bimetallic strip will cause the bimetallic strip to deform in a direction away from the conductive connector when the temperature of the bimetallic strip exceeds a second threshold temperature value but does not exceed the first threshold temperature value, such that a contact area between the bimetallic strip and the conductive connector decreases as the bimetallic strip deforms.

In some embodiments of the first battery assembly, the second threshold temperature value is greater than or equal to 30° C. and less than or equal to 50° C.

A second battery assembly may comprise a first battery comprising a first terminal, a second battery comprising a second terminal, a conductive connector comprising a first end and a second end, a spring mechanically coupled to the conductive connector and a sacrificial block disposed on a surface of the conductive connector, wherein the sacrificial block forces the spring into an energy-storing configuration, wherein, when the spring is forced into the energy-storing configuration, the first end of the conductive connector is electrically coupled to the first terminal and the second end of the conductive connector is electrically coupled to the second terminal and wherein the sacrificial block is configured to melt when a battery assembly temperature exceeds a threshold temperature value such that, when the sacrificial block melts, the spring relaxes from the energy-storing configuration and mechanically displaces the conductive connector to break the electrical coupling between the first end of the conductive connector and the first terminal and the electrical coupling between the second end of the conductive connector and the second terminal.

In some embodiments of the second battery assembly, the first battery and the second battery are rechargeable.

In some embodiments of the second battery assembly, the spring is a helical spring.

In some embodiments of the second battery assembly, the energy-storing configuration is a compressed configuration.

In some embodiments of the second battery assembly, the spring is a torsion spring that is mechanically coupled to the conductive connector by an insulating shaft.

In some embodiments of the second battery assembly, the energy-storing position is a twisted configuration.

In some embodiments of the second battery assembly, the conductive connector comprises copper.

In some embodiments of the second battery assembly, the sacrificial block comprises a phase change material (PCM).

In some embodiments of the second battery assembly, the threshold temperature value is between 50° C. and 100° C.

A third battery assembly may comprise a battery comprising a first terminal electrically coupled to a first relay and a second terminal electrically coupled to a second relay and a thermopile, wherein a hot junction of the thermopile is positioned proximate to the battery and a cold junction of the thermopile is positioned distally from the battery with respect to the hot junction and wherein the first relay and the second relay are electrically coupled to the thermopile, wherein the thermopile and the first and second relays are configured such that, when a temperature gradient of the thermopile exceeds a threshold gradient value, the thermopile generates a voltage that causes one or both of the first and second relays to disconnect one or both of the first and second terminals from a circuit.

In some embodiments of the third battery assembly, the battery is rechargeable.

In some embodiments of the third battery assembly, the circuit is a charging circuit for the battery.

In some embodiments of the third battery assembly, the thermopile comprises a thermoelectric cell comprising iron and copper.

In some embodiments of the third battery assembly, the threshold gradient value is less than or equal to 0.3° C./inch.

BRIEF DESCRIPTION OF THE FIGURES

The following figures show various battery assemblies with thermal runaway prevention mechanisms and/or associated data, in accordance with some embodiments. The battery assemblies shown in the figures may, in some embodiments, have any one or more of the characteristics described herein.

DETAILED DESCRIPTION

When a system undergoes thermal runaway, increases in the system temperature cause releases of energy that, in turn, lead to further increases in the system temperature. In other words, thermal runaway is a positive feedback reaction that causes a system to heat itself, often in an uncontrolled manner that can lead to significant system damage. In a battery assembly, thermal runaway may occur when the electrolyte interfaces of one or more of the batteries in the assembly is compromised, or if the electrodes of one or more of the batteries are shorted due to thermal, mechanical, and/or electrical issues. For example, thermal runaway may occur in rechargeable battery packs if the batteries are overcharged (e.g., if the batteries are charged using a voltage that is too high).

Figure 1:
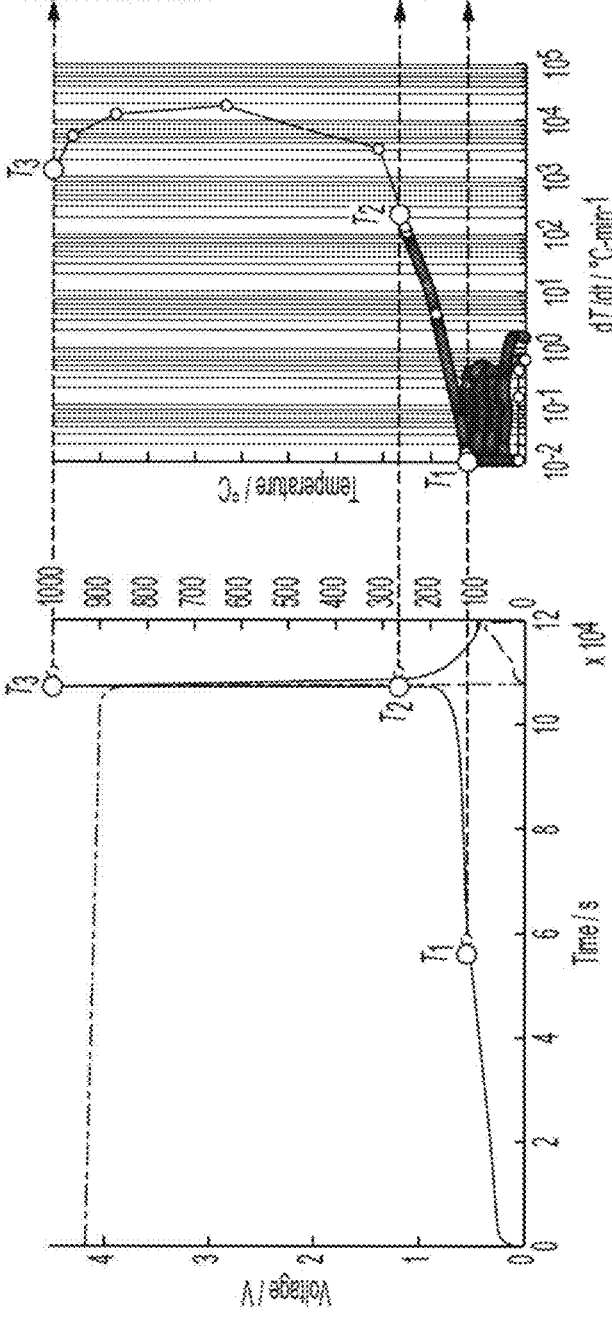
FIG. 1 shows plots of the behavior of battery voltage, temperature, and rate of change of temperature during thermal runaway, according to some embodiments.

FIG. 1 shows plots of the behavior of battery voltage, temperature, and rate of change of temperature during thermal runaway. As shown, thermal runaway may be characterized by several temperature values. A first temperature value, $T_1$, may indicate a loss of thermal stability in the battery. When temperature of the battery is below $T_1$, the rate of change of the temperature of the battery may be small—e.g., the battery's temperature may be constant or nearly constant, even if the voltage increases. However, as the temperature of the battery approaches or exceeds $T_1$, the rate of change of the battery's temperature may increase. The increasing rate of change of the battery's temperature may cause the battery's temperature to jump to a second temperature value $T_2$. This may be a "triggering" temperature at which uncontrollable reactions (e.g., the reactions that cause thermal runaway) begin to occur in the battery. Following the onset of the uncontrollable reactions, the battery's temperature may increase at an increasingly rapid rate until it reaches a third temperature value $T_3$. Temperature value $T_3$ may be correlated with a total amount of energy that is released by the battery during thermal runaway.

Provided herein are battery assemblies with thermal runaway prevention mechanisms. In some embodiments, the battery assemblies may be configured to break electrical coupling between two or more batteries or between a battery and another circuit when a temperature of the battery assembly exceeds a threshold temperature value. In some embodiments, this threshold temperature value may be a temperature value that indicates a loss of thermal stability in the battery assembly (e.g., $T_1$ in FIG. 1). In some embodiments, the thermal runaway prevention mechanisms may be analog mechanisms that are configured to prevent thermal runaway in battery assemblies without the aid of an electronic monitoring system such as a battery management system.

Figure 2A:
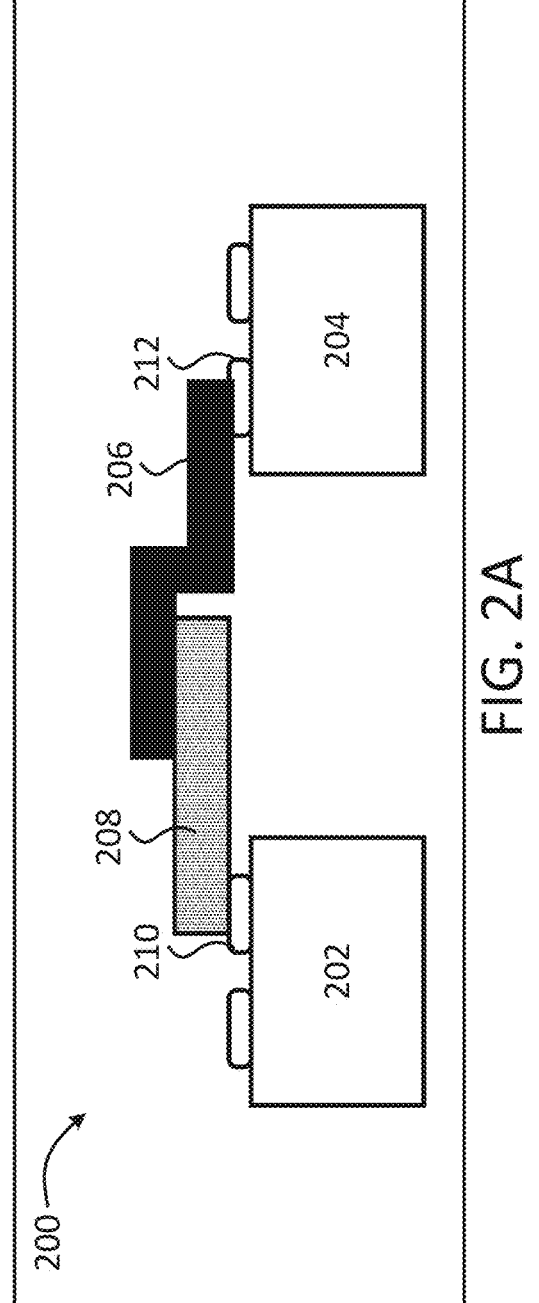
FIG. 2A shows a battery assembly for thermal runaway prevention in a normal temperature state, according to some embodiments.
Figure 2B:
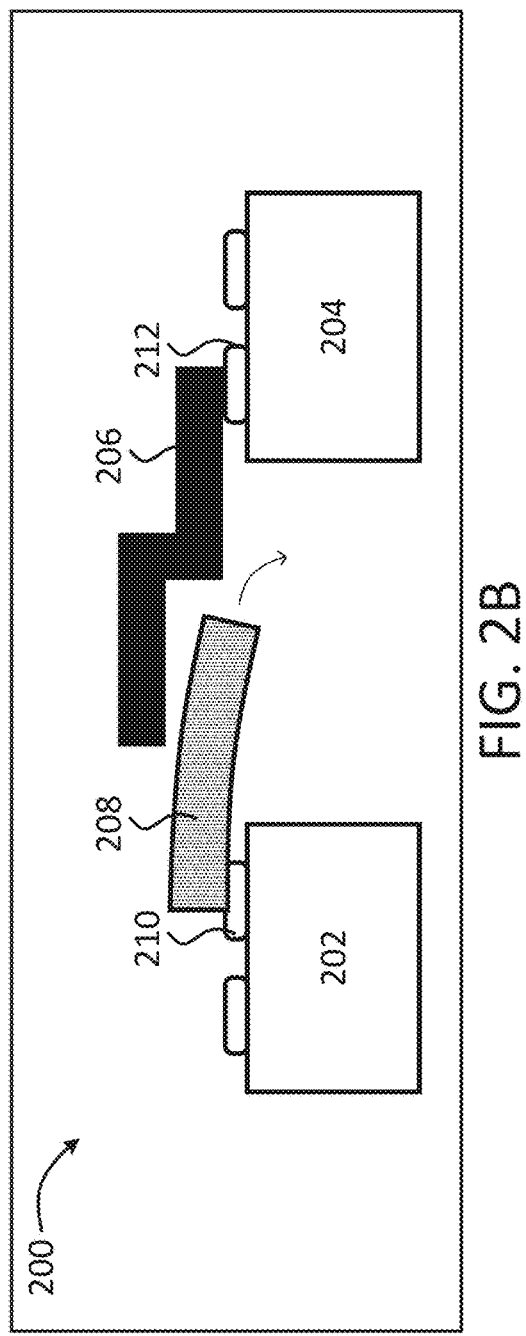
FIG. 2B shows a battery assembly for thermal runaway prevention in a high temperature state, according to some embodiments.

FIGS. 2A-2B show a battery assembly for thermal runaway prevention in a normal temperature state (FIG. 2A) and a high temperature state (FIG. 2B), according to some embodiments. Specifically, FIG. 2 shows a battery assembly 200. Battery assembly 200 may be any collection of a plurality of batteries or electrochemical cells. In some embodiments, battery assembly 200 may be a battery pack or a power bank configured to provide energy to an electric circuit or an electronic device.

As shown, battery assembly 200 may comprise a first battery 202 and a second battery 204. First battery 202 may comprise a terminal 210. In some embodiments, terminal 210 may be a positive terminal or a negative terminal. Similarly, second battery 204 may comprise a terminal 212. In some embodiments, terminal 212 may be a positive terminal or a negative terminal. A bimetallic strip 208 may be electrically coupled to terminal 210 of battery 202, and a conductive connector 206 may be electrically coupled to terminal 212 of battery 204. In some embodiments, battery assembly 200 may comprise one or more batteries in addition to battery 202 and battery 204; such batteries may be electrically coupled to bimetallic strips (like first battery 202) or to conductive connectors (like second battery 204).

In some embodiments, one or more of battery 202 and battery 204 may be primary (e.g., "disposable") batteries. For example, in some embodiments, one or more of battery 202 and battery 204 may be a(n) alkaline, zinc-carbon, zinc-chloride, or lithium battery. In some embodiments, one or more of battery 202 and battery 204 may be secondary (e.g., "rechargeable") batteries. In some embodiments, one or more of battery 202 and battery 204 may be a lithium-ion, nickel metal hydride, silver oxide, or nickel-zinc battery. In some embodiments, one or more of battery 202 and battery 204 may be a AAAA, AAA, A, B, C, or D battery.

In some embodiments, one or more of battery 202 and battery 204 may have a voltage greater than or equal to 1, 2, 3, 4, 5, 10, 15, or 20 volts. In some embodiments, one or more of battery 202 and battery 204 may have a voltage less than or equal to 1, 2, 3, 4, 5, 10, 15, or 20 volts. In some embodiments, a voltage difference across the terminals of one or more of battery 202 and battery 204 may be greater than or equal to 0.1, 0.25, 0.5, 0.75, 1, 1.5, 2, 2.5, or 3 volts.

In some embodiments, one or more of battery 202 and battery 204 may have a capacity of at least 0.01, 0.025, 0.050, 0.075, 0.1, 0.25, 0.5, 0.75, 1, 25, 50, 75, or 100 amp-hours. In some embodiments, one or more of battery 202 and battery 204 may have a capacity of no more than 0.01, 0.025, 0.050, 0.075, 0.1, 0.25, 0.5, 0.75, 1, 25, 50, 75, or 100 amp-hours.

In some embodiments, battery sizes of one or more of battery 202 and battery 204 may be greater than or equal to 10 kWh, 50 kWh, 100 kWh, 500 kWh, 1 MWh, 10 MWh, 50 MWh, or 100 MWh. In some embodiments, battery sizes of one or more of battery 202 and battery 204 may be less than or equal to 10 kWh, 50 kWh, 100 kWh, 500 kWh, 1 MWh, 10 MWh, 50 MWh, or 100 MWh. In some embodiments, one or more of battery 202 and battery 204 may be pouch batteries. In some embodiments, one or more of battery 202 and battery 204 may be prismatic batteries. In some embodiments, one or more of battery 202 and battery 202 may be cylindrical batteries.

In some embodiments, one or more of battery 202 and battery 204 may be a battery module comprising a plurality of electrochemical cells. In some embodiments, one or more of battery 202 and battery 204 may be a battery module configured to be mounted on a rack. In some embodiments, one or more of battery 202 and battery 204 may be a battery module tower. A battery module tower may be greater than or equal to 0.25, 0.5, 0.75, 1, 1.5, 2, 2.5, or 3 feet in one or more dimensions. A battery module tower may be less than or equal to 0.25, 0.5, 0.75, 1, 1.5, 2, 2.5, or 3 feet in one or more dimensions.

Conductive connector 206 may comprise any electrically conductive material. In some embodiments, conductive connector 206 may comprise copper, aluminum, gold, or silver. In some embodiments, conductive connector 206 may be fixed to terminal 212 of battery 204 by a clip, a snap connection, or solder.

Just as conductive connector 206 may be fixed to terminal 212 of battery 204, bimetallic strip 208 may be fixed to terminal 210 of battery 202. In some embodiments, bimetallic strip 208 may be fixed to terminal 210 by a clip, a snap connection, or solder. Bimetallic strip 208 may be configured to mechanically displace in response to changes in its temperature. Bimetallic strip 208 may comprise a first metal layer and a second metal layer. The first metal layer and the second metal layer may expand and contract at different rates as the temperature of bimetallic strip 208 changes. The difference in the thermal expansion rates between the first metal layer and the second metal layer may cause bimetallic strip to deform (e.g., to bend) in a direction away from conductive connector 206 as the temperature of bimetallic strip 208 increases.

Figure 3A:
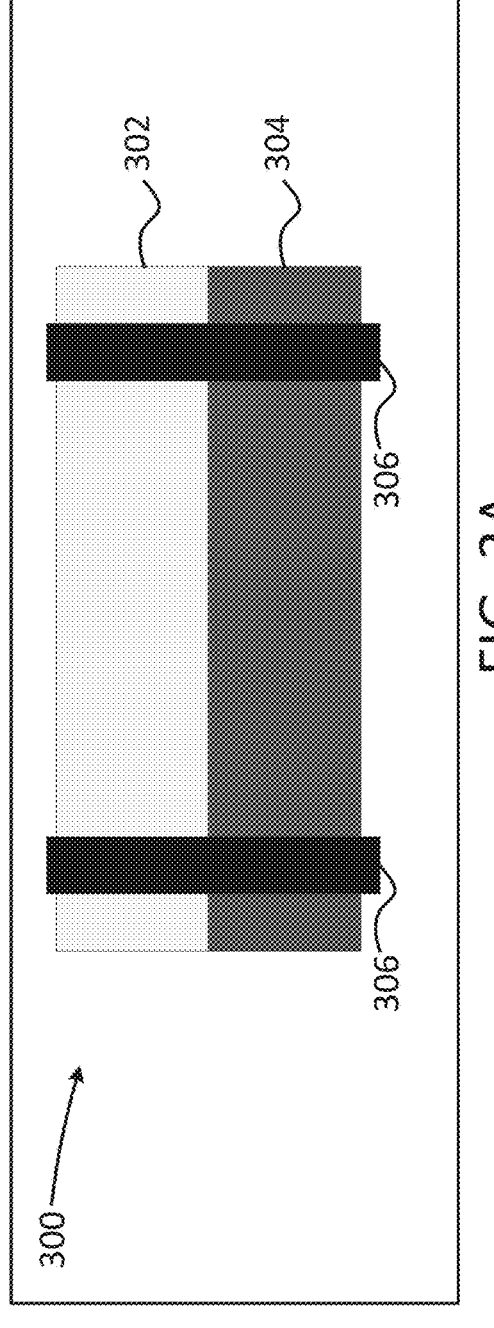
FIG. 3A shows a bimetallic strip in a normal temperature (e.g., undeformed) state, according to some embodiments.
Figure 3B:
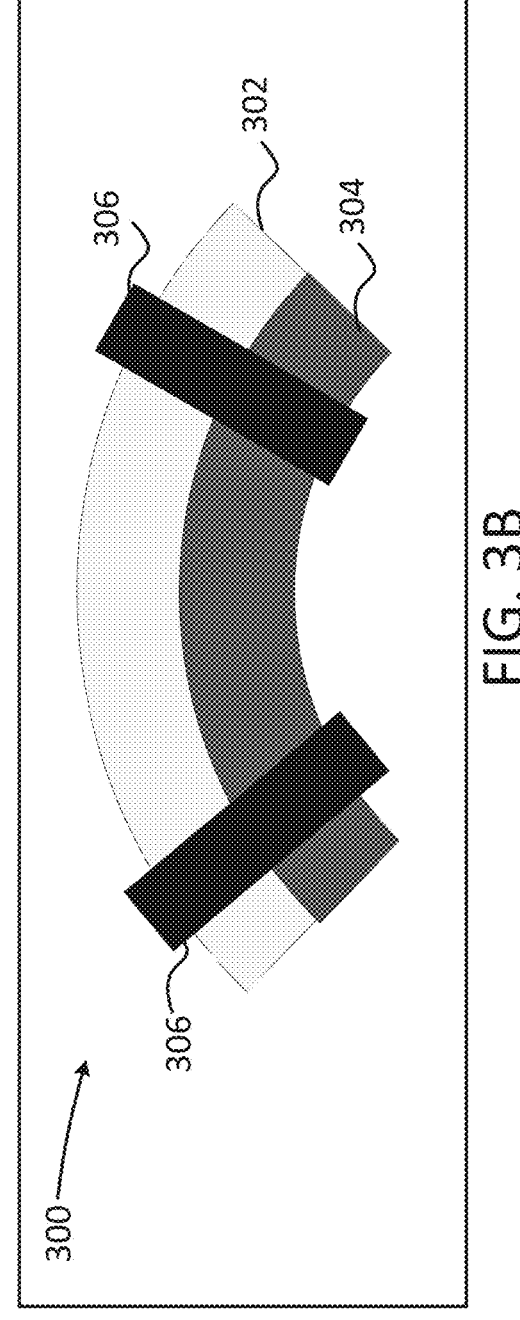
FIG. 3B shows a bimetallic strip in a high temperature (e.g., undeformed) state, according to some embodiments.

FIGS. 3A-3B illustrate a bimetallic strip 300 in a normal temperature (e.g., undeformed) state (FIG. 3A) and in a heated (e.g., deformed) state (FIG. 3B). As shown, a bimetallic strip 300 may comprise a first metal layer 302 and a second metal layer 304. In some embodiments, first metal layer 302 may be mechanically coupled to second metal layer 304 by one or more connectors 306. In some embodiments, first metal layer 302 may be mechanically coupled to second metal layer 304 by riveting, brazing, or welding. In some embodiments, first metal layer 302 may have a higher coefficient of thermal expansion than second metal layer 304. As the temperature of bimetallic strip 300 increases, bimetallic strip may deform in a direction toward second metal layer 304, e.g., in a direction of the metal layer with the lower coefficient of thermal expansion. In some embodiments, first metal layer 302 may comprise copper. In some embodiments, second metal layer 304 may comprise steel.

In some embodiments, bimetallic strip 300 may be greater than or equal to 0.01, 0.05, 0.075, 0.1, 0.25, or 0.5 inches thick. In some embodiments, bimetallic strip 300 may be less than or equal to 0.01, 0.05, 0.075, 0.1, 0.25, or 0.5 inches thick. In some embodiments, bimetallic strip 300 may be greater than or equal to 0.25, 0.5, 0.75, 1, 2, 3, 4, or 5 inches long. In some embodiments, bimetallic strip 300 may be less than or equal to 0.25, 0.5, 0.75, 1, 2, 3, 4, or 5 inches long. In some embodiments, when the temperature of bimetallic strip 300 increases, a tip of bimetallic strip 300 may deflect at least 0.125, 0.25, 0.375, 0.5, 0.625, 0.75, 0.875, or 1 inch(es) in a direction away from its ambient-temperature position. In some embodiments, when the temperature of bimetallic strip 300 increases, a tip of bimetallic strip 300 may deflect less than or equal to 0.125, 0.25, 0.375, 0.5, 0.625, 0.75, 0.875, or 1 inch(es) in a direction away from its ambient-temperature position.

In some embodiments, bimetallic strip 208 of battery assembly 200 shown in FIG. 2 may include one or more features of bimetallic strip 300. In some embodiments, one or more properties of bimetallic strip 208 (e.g., length or thickness) may be customized based on the geometry of terminal 210 and/or based on the geometry of conductive connector 206.

As mentioned above, FIG. 2A shows battery assembly 200 in a normal (e.g., ambient) temperature state. In this state, the temperature of bimetallic strip 208 may be below a threshold temperature value at which bimetallic strip 208 begins to deform. In its undeformed state, bimetallic strip 208 may be in physical contact with conductive connector 206. The physical contact between conductive connector 206 and bimetallic strip 208 may generate electrical coupling between conductive connector 206 and bimetallic strip 208, thereby electrically coupling battery 202 to battery 204.

Due to the electrical coupling between batteries 202 and 204, conductive connector 206, and bimetallic strip 208, any changes in the temperature of batteries 202 and 204 may cause corresponding changes in the temperature of bimetallic strip 208. In particular, if the temperature at either of terminals 210 or 212 increases (e.g., as a result of chemical issues within battery 202 or battery 204, or as a result of electrical issues with battery assembly 200), the temperature of bimetallic strip 208 may increase, as well. In some embodiments, as the temperature of bimetallic strip 208 increases, bimetallic strip may deform in a direction away from conductive connector 206. In some embodiments, if the temperature of bimetallic strip 208 exceeds a threshold temperature, bimetallic strip 208 may be configured to deform such that the deformation causes bimetallic strip 208 to disconnect from conductive connector 206, thereby breaking the electrical coupling between bimetallic strip 208 and conductive connector 208 (and, thus, the electrical coupling between batteries 202 and 204), as shown in FIG. 2B.

In some embodiments, the threshold temperature may be associated with a temperature value that is associated with a loss of stability in battery assembly 200. In some embodiments, the threshold temperature may be associated with one or more ideal operating temperatures for battery 202 and/or battery 204 (e.g., a range of temperature values beyond which the performance of battery 202 and/or battery 204 may begin to degrade). In some embodiments, the threshold temperature may be greater than or equal to 30, 35, 40, 45, 50, or 55° C. In some embodiments, the threshold temperature may be less than or equal to 30, 35, 40, 45, 50, or 55° C.

When conductive connector 206 and bimetallic strip 208 are in physical contact (as shown in FIG. 2A), battery 202 and battery 204 may be electrically coupled to one another. In other words, when conductive connector 206 and bimetallic strip 208 are in physical contact, current may flow between battery 202 and battery 204 through conductive connector 206 and bimetallic strip 208. Specifically, current may pass between conductive connector 206 and bimetallic strip 208 through the contact area between conductive connector 206 and bimetallic strip 208. In some embodiments, when the temperature of the bimetallic strip is greater than or equal to a temperature value that is associated with a loss of stability in battery assembly 200 but less than the threshold temperature, bimetallic strip 208 may deform in a direction away from conductive connector 206 such that the contact area between bimetallic strip 208 and conductive connector 206 decreases as bimetallic strip 208 deforms. As the contact area between bimetallic strip 208 and conductive connector 206 decreases, current flowing between battery 202 and battery 204 through the contact area may be forced to pass through a spatial region that is smaller than the region it passes through at normal (e.g., ambient) temperatures. Forcing the current to pass through a smaller contact area may produce additional increases in the temperature of bimetallic strip 208, accelerating the deformation of bimetallic strip 208 until it completely disconnects from conductive connector 206. This may ensure that the electrical coupling between battery 202 and battery 204 breaks whenever the temperature of bimetallic strip 208 increases beyond a temperature that is indicative of a loss of stability in battery 202 and battery 204, reducing the likelihood of damage to battery assembly 200.

Figure 4A:
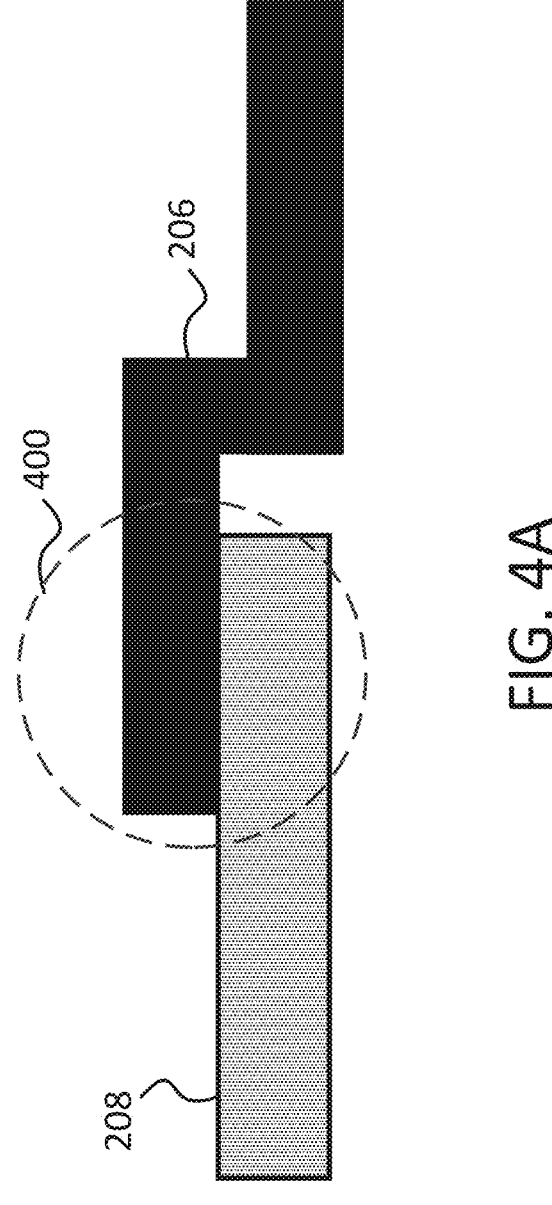
FIG. 4A shows a side-view of the contact area between a conductive connector and a bimetallic strip when the temperature of the bimetallic strip is below the temperature value that is associated with loss of stability in a battery assembly, according to some embodiments.
Figure 4B:
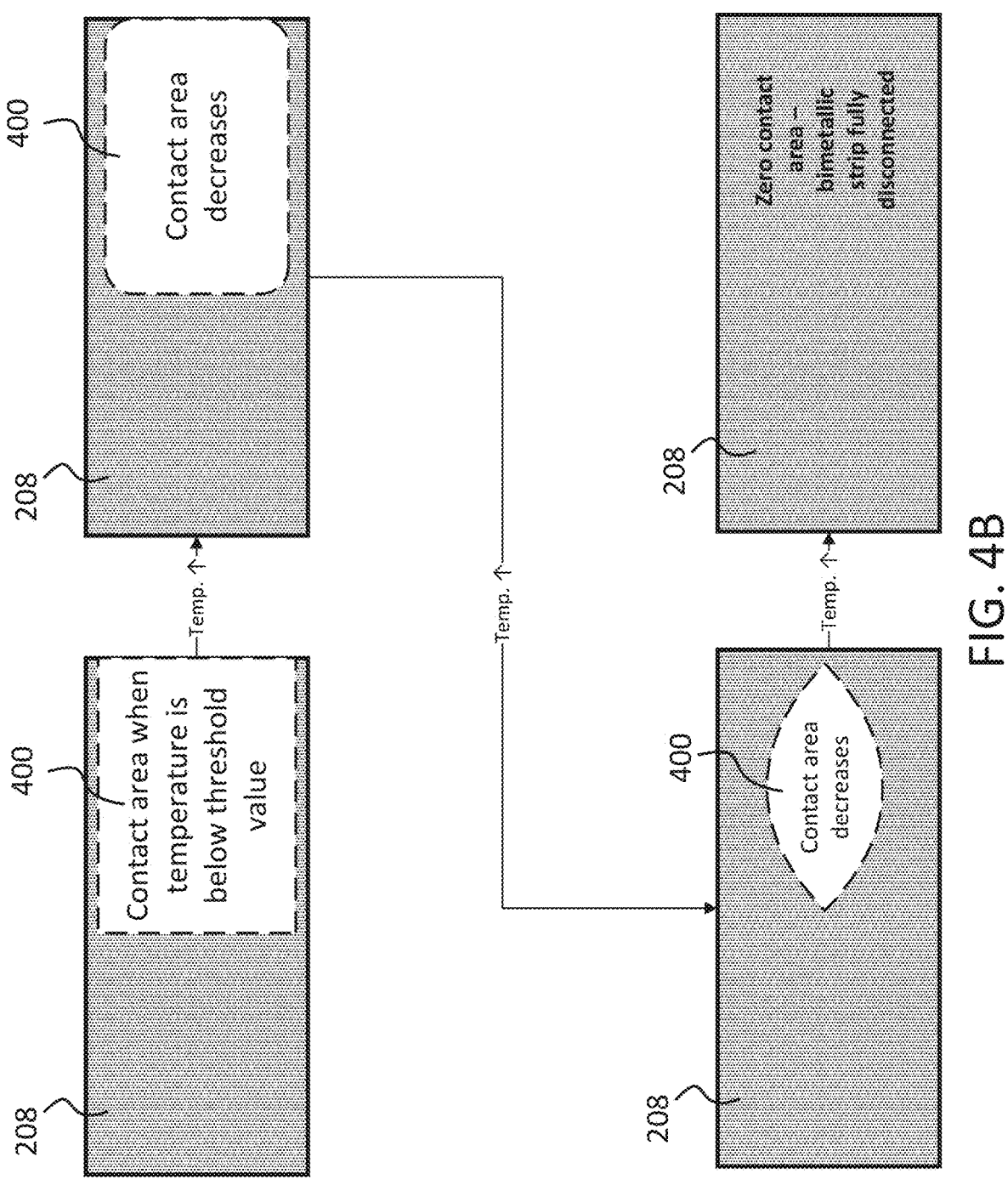
FIG. 4B shows top views of the contact area between a conductive connector and a bimetallic strip as the temperature of the bimetallic strip increases and the bimetallic strip deforms in a direction away from the conductive connector.

FIG. 4A shows a side-view of the contact area 400 between conductive connector 206 and bimetallic strip 208 when the temperature of bimetallic strip 208 is below the temperature value that is associated with loss of stability in battery assembly 200. FIG. 4B illustrates top views of contact area 400 on bimetallic strip 208 as the temperature of bimetallic strip 208 increases and bimetallic strip 208 deforms in a direction away from conductive connector 206. As shown, the temperature of bimetallic strip may initially be below a threshold value (e.g., below a value associated with a loss of stability in battery assembly 200), and contact area 400 may be maximized. When the temperature of bimetallic strip 208 increases, bimetallic strip 208 may begin to deform, and contact area 400 may decrease. Decreases in contact area 400 force current flowing between batteries 202 and 204 to pass through a smaller spatial region. This, in turn, produces additional temperature increases in bimetallic strip 208, accelerating the deformation of bimetallic strip 208 and further decreasing contact area 400. Eventually, the temperature of bimetallic strip 208 may exceed a threshold value, and contact area 400 may disappear as bimetallic strip 208 detaches completely from conductive connector 206.

In some embodiments, contact area 400 may decrease non-linearly (e.g., following a non-linear power law) or exponentially as the temperature of bimetallic strip 208 increases. In some embodiments, the disconnection of bimetallic strip 208 and conductive connector 206 may be self-perpetuating whenever the temperature of bimetallic strip 208 exceeds 50° C.

Figures 5A, 5B:
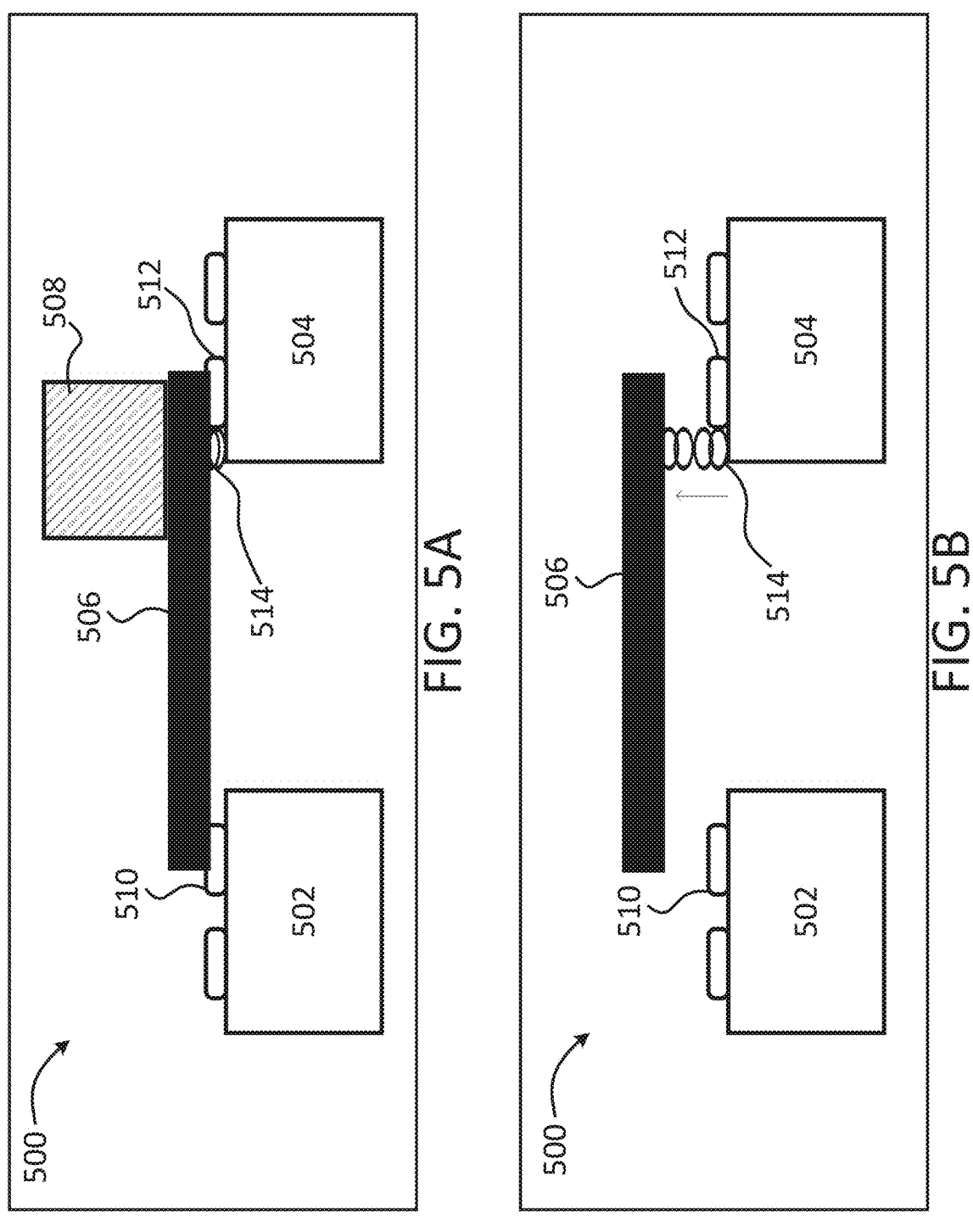
FIG. 5A shows a battery assembly for thermal runaway prevention in a normal temperature state, according to some embodiments.
FIG. 5B shows a battery assembly for thermal runaway prevention in a high temperature state, according to some embodiments.

FIGS. 5A-5B show a battery assembly for thermal runaway prevention in a normal temperature state (FIG. 5A) and a high temperature state (FIG. 5B), according to some embodiments. Specifically, FIGS. 5A-5B show a battery assembly 500. Battery assembly 500 may be any collection of a plurality of batteries or electrochemical cells. In some embodiments, battery assembly 500 may be a battery pack or a power bank configured to provide energy to an electric circuit or an electronic device.

As shown, battery assembly 500 may comprise a first battery 502 and a second battery 504. First battery 502 may comprise a terminal 510. In some embodiments, terminal 510 may be a positive terminal or a negative terminal. Similarly, second battery 504 may comprise a terminal 512. A conductive connector 506 may be configured to electrically couple to terminals 210 and 212. In some embodiments, battery assembly 200 may comprise one or more batteries in addition to battery 202 and battery 204; such batteries may be electrically coupled to bimetallic strips (like first battery 202) or to conductive connectors (like second battery 204).

In some embodiments, one or more of battery 502 and battery 504 may be primary (e.g., "disposable") batteries. For example, in some embodiments, one or more of battery 502 and battery 504 may be a(n) alkaline, zinc-carbon, zinc-chloride, or lithium battery. In some embodiments, one or more of battery 502 and battery 504 may be secondary (e.g., "rechargeable") batteries. In some embodiments, one or more of battery 502 and battery 504 may be a lithium-ion, nickel metal hydride, silver oxide, or nickel-zinc battery. In some embodiments, one or more of battery 502 and battery 504 may be a AAAA, AAA, A, B, C, or D battery.

In some embodiments, one or more of battery 502 and battery 504 may have a voltage greater than or equal to 1, 2, 3, 4, 5, 10, 15, or 20 volts. In some embodiments, one or more of battery 502 and battery 504 may have a voltage less than or equal to 1, 2, 3, 4, 5, 10, 15, or 20 volts.

In some embodiments, one or more of battery 502 and battery 504 may have a capacity of at least 0.01, 0.025, 0.050, 0.075, 0.1, 0.25, 0.5, 0.75, 1, 25, 50, 75, or 100 amp-hours. In some embodiments, one or more of battery 502 and battery 504 may have a capacity of no more than 0.01, 0.025, 0.050, 0.075, 0.1, 0.25, 0.5, 0.75, 1, 25, 50, 75, or 100 amp-hours.

In some embodiments, battery sizes of one or more of battery 502 and battery 504 may be greater than or equal to 10 kWh, 50 kWh, 100 kWh, 500 kWh, 1 MWh, 10 MWh, 50 MWh, or 100 MWh. In some embodiments, battery sizes of one or more of battery 502 and battery 504 may be less than or equal to 10 kWh, 50 kWh, 100 kWh, 500 kWh, 1 MWh, 10 MWh, 50 MWh, or 100 MWh. In some embodiments, one or more of battery 502 and battery 504 may be pouch batteries. In some embodiments, one or more of battery 502 and battery 504 may be prismatic batteries. In some embodiments, one or more of battery 502 and battery 504 may be cylindrical batteries.

In some embodiments, one or more of battery 502 and battery 504 may be a battery module comprising a plurality of electrochemical cells. In some embodiments, one or more of battery 502 and battery 504 may be a battery module configured to be mounted on a rack. In some embodiments, one or more of battery 502 and battery 504 may be a battery module tower. A battery module tower may be greater than or equal to 0.25, 0.5, 0.75, 1, 1.5, 2, 2.5, or 3 feet in one or more dimensions. A battery module tower may be less than or equal to 0.25, 0.5, 0.75, 1, 1.5, 2, 2.5, or 3 feet in one or more dimensions.

Conductive connector 506 may comprise any electrically conductive material. In some embodiments, conductive connector 506 may comprise copper, aluminum, gold, or silver.

In some embodiments, battery assembly 500 may comprise a spring 514. Spring 514 may be disposed near terminal 512 of battery 504 and may be mechanically coupled to battery 504 and conductive connector 506. In some embodiments, spring 514 may be a helical spring with a coil diameter greater than or equal to 0.5, 1, 2, 5, 10, 15, or 20 cm. In some embodiments, spring 514 may be a helical spring with a coil diameter less than or equal to 0.5, 1, 2, 5, 10, 15, or 20 cm. In some embodiments, spring 514 may comprise steel. In some embodiments, spring 514 may have a stiffness greater than or equal to 0.5, 1, 5, 10, 20, 30, 40, or 50 N/m. In some embodiments, spring 514 may have a stiffness less than or equal to 0.5, 1, 5, 10, 20, 30, 40, or 50 N/m.

In some embodiments, battery assembly 500 may comprise a sacrificial block 508. As shown in FIG. 5A, sacrificial block 508 may be disposed on a surface of and thermally coupled to conductive connector 506. In some embodiments, conductive connector 506 may exert a force on spring 514 that causes spring 514 to compress (e.g., forces spring 514 into an energy-storing configuration). Sacrificial block 508 may be configured to melt or disintegrate when the temperature of battery assembly 500 exceeds a threshold temperature value. When sacrificial block 508 melts, spring 514 may decompress from its compressed position. As spring 514 decompresses, it may exert a force on conductive connector 506 that causes conductive connector 506 to move in a direction away from terminals 510 and 512. This may break the electrical coupling between conductive connector 506 and batteries 502 and 504, as shown in FIG. 5B.

In some embodiments, sacrificial block 508 may comprise a phase change material (PCM) that is configured to change from a solid phase to a liquid phase when its temperature exceeds a threshold temperature value. In some embodiments, sacrificial block 508 may comprise wax (or similar substances).

In some embodiments, the threshold temperature at which sacrificial block 508 begins to melt may be associated with a temperature value that is associated with a loss of stability in battery assembly 500. In some embodiments, the threshold temperature may be associated with one or more ideal operating temperatures for battery 502 and/or battery 504 (e.g., a range of temperature values beyond which the performance of battery 502 and/or battery 504 may begin to degrade). In some embodiments, the threshold temperature may be greater than or equal to 30, 35, 40, 45, or 50° C. In some embodiments, the threshold temperature may be less than or equal to 30, 35, 40, 45, or 50° C.

Figure 6A:
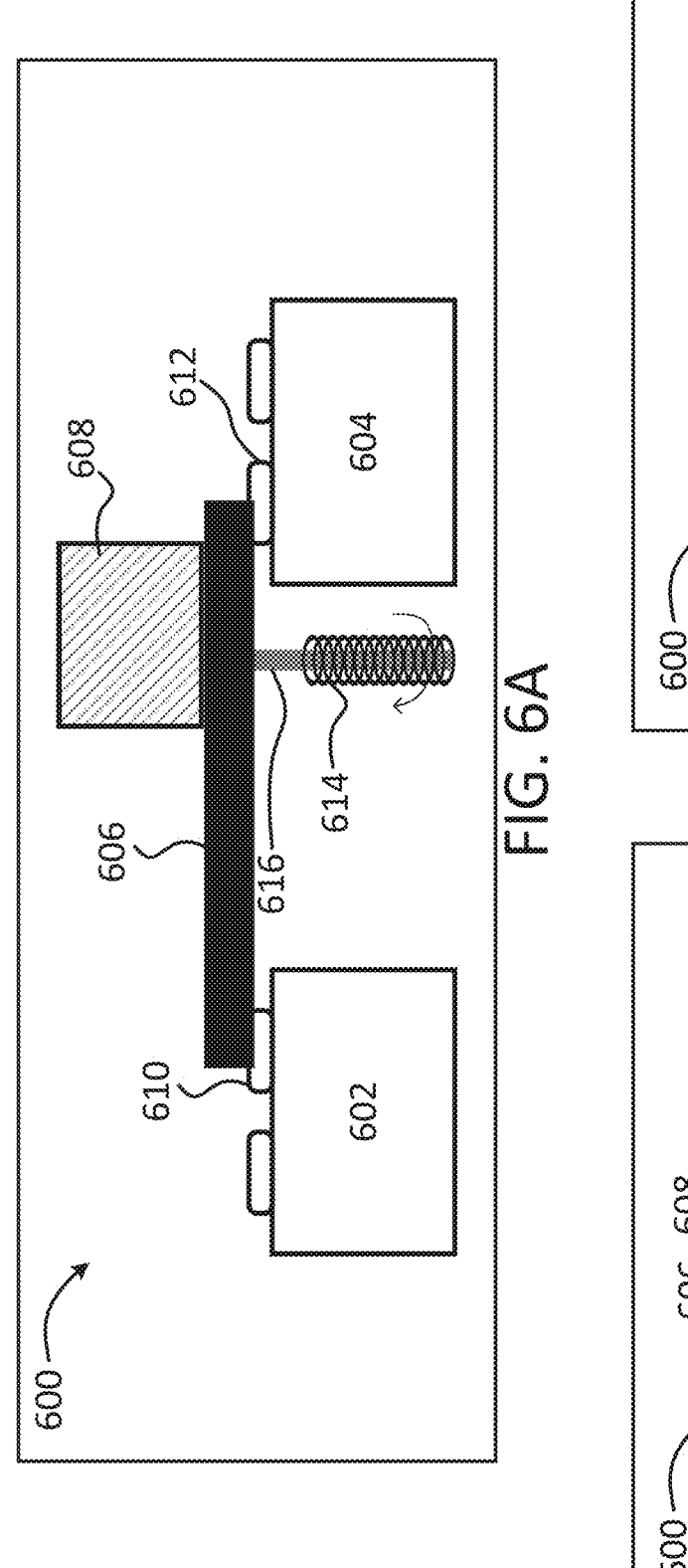
FIG. 6A shows a side view of a battery assembly for thermal runaway prevention in a normal temperature state, according to some embodiments.
Figure 6C:
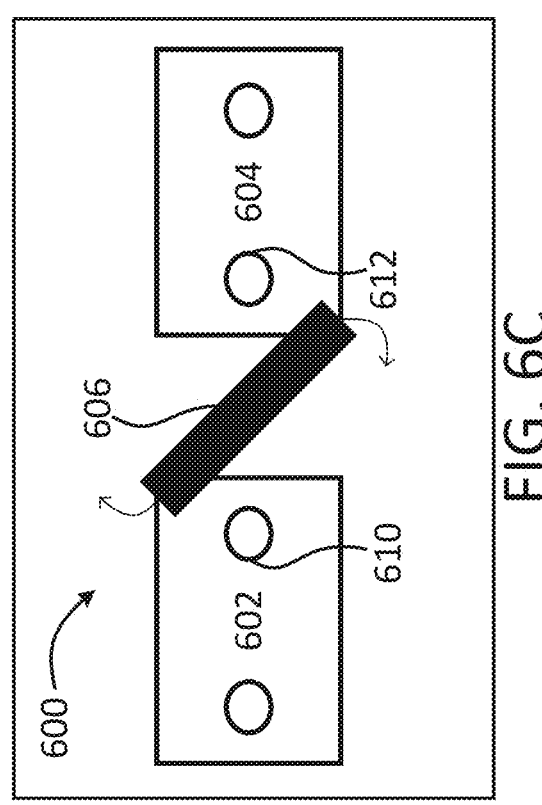
FIG. 6C shows a top view of a battery assembly for thermal runway prevention in a high temperature state, according to some embodiments.
Figure 6B:
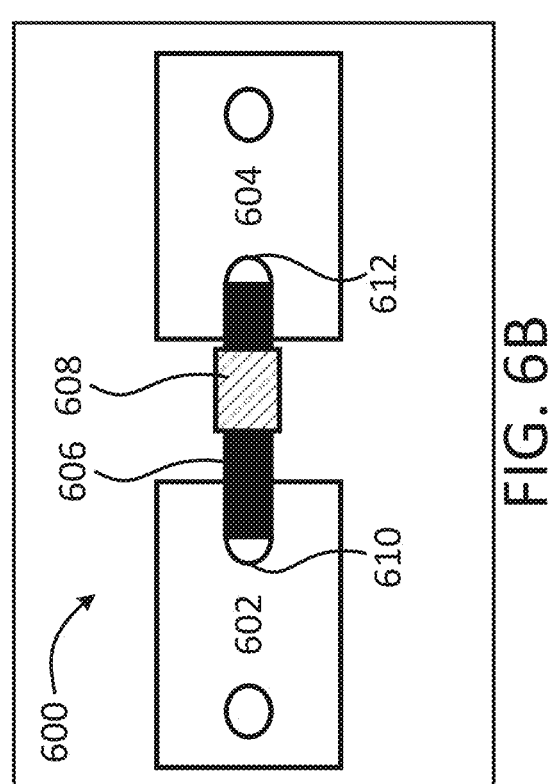
FIG. 6B shows a top view of a battery assembly for thermal runaway prevention in a normal temperature state, according to some embodiments.

FIGS. 6A-6C show a battery assembly for thermal runaway prevention in a normal temperature state (FIGS.

6A-6B) and in a high temperature state (FIG. 6C). Specifically, FIGS. 6A-6C show a battery assembly 600 comprising a first battery 602 and a second battery 604. In some embodiments, battery 602 and/or battery 604 may be similar to or the same as battery 502 and/or battery 504 of battery assembly 500 shown in FIGS. 5A-5B.

FIG. 6A illustrates a side view of battery assembly 600 in a normal temperature state and FIG. 6B illustrates a top view of battery assembly 600 in a normal temperature state. As shown, in a normal temperature state, a terminal 610 of battery 602 may be electrically coupled to a terminal 610 of battery 604 by a conductive connector 606. Conductive connector 606 may be the same as or include one or more features of conductive connector 506 shown in FIGS. 5A-5B. Conductive connector 606 may be mounted on an insulating shaft 616.

Insulating shaft may be rigid and resistant to thermal expansion and corrosion. In some embodiments, insulating shaft 616 may comprise plastic, glass, or rubber. In some embodiments, insulating shaft 616 may be greater than or equal to 0.25, 0.5, 0.75, 1, 2, 3, 4, or 5 inches in height. In some embodiments, insulating shaft 616 may be less than or equal to 0.25, 0.5, 0.75, 1, 2, 3, 4, or 5 inches in height.

In some embodiments, a torsion spring 614 may be wrapped around and mechanically coupled to insulating shaft 616. Torsion spring 614 may be configured to store mechanical energy when it is twisted along its central axis (e.g., the axis that is parallel to insulating shaft 616). When torsion spring 614 is twisted and subsequently untwisted, the mechanical energy that is stored in torsion spring 614 may be released.

In some embodiments, in a normal temperature state, battery assembly 600 may comprise a sacrificial block 608. Sacrificial block 608 may be mounted on a surface of and thermally coupled to conductive connector 606. In some embodiments, sacrificial block 608 may include one or more features of sacrificial block 508 shown in FIG. 5A. In some embodiments, sacrificial block may exert a force on torsion spring 614 that holds torsion spring 614 in a twisted state (i.e., forces spring 614 into an energy-storing configuration). Sacrificial block 608 may be configured to melt or disintegrate when the temperature of battery assembly 600 exceeds a threshold temperature value. When sacrificial block 608 melts, spring 614 may untwist from its twisted position. As spring 614 untwists, it may exert a force on conductive connector 606 that causes insulating shaft 616 to rotate conductive connector 606 in a direction away from terminals 610 and 612. This may break the electrical coupling between conductive connector 606 and batteries 602 and 604, as shown in FIG. 6C.

Figure 6D:
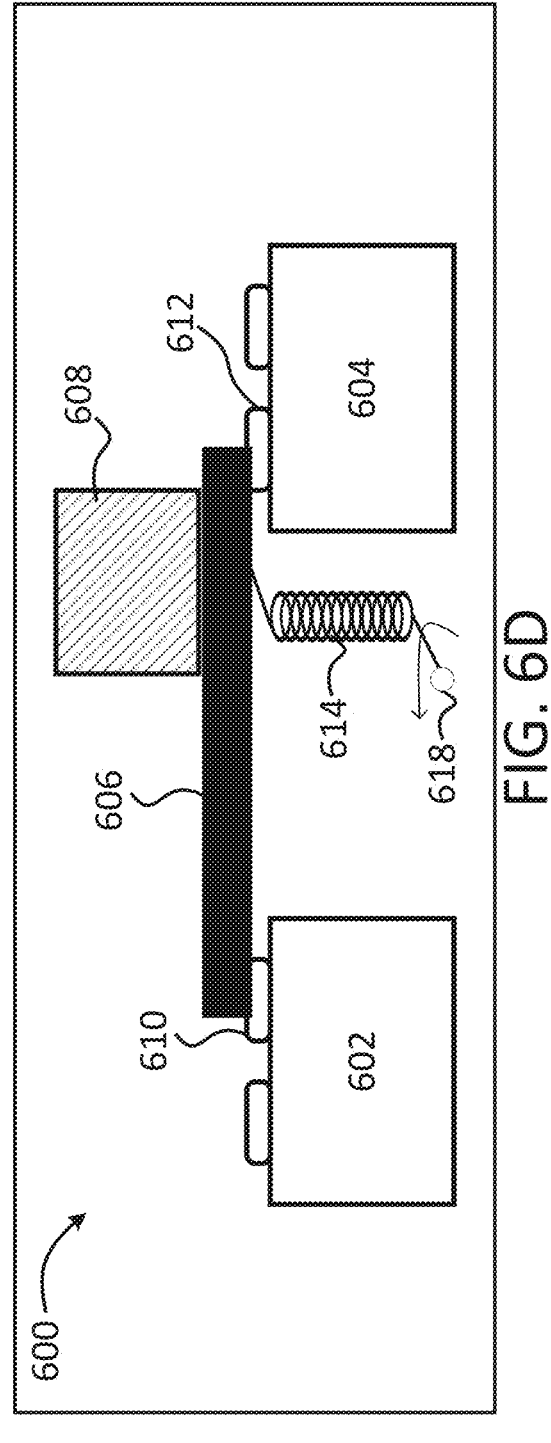
FIG. 6D shows a side view of a battery assembly for thermal runaway prevention in a normal temperature state, according to some embodiments.

In some embodiments, rather than coupling spring 614 to an insulating shaft, spring 614 may be mounted on a pivot 618 and coupled directly to conductive connector 606, as shown in FIG. 6D. In a normal temperature state, sacrificial block may exert a force on spring 614 that holds spring 614 in a twisted state (e.g., forces spring 614 into an energy-storing configuration). If the temperature of battery assembly 600 exceeds a threshold temperature value and causes sacrificial block 608 to melt, spring 614 may untwist from its twisted position, forcing conductive connector 606 in a direction away from terminals 610 and 612 (e.g., as shown in FIG. 6C).

Figure 7:
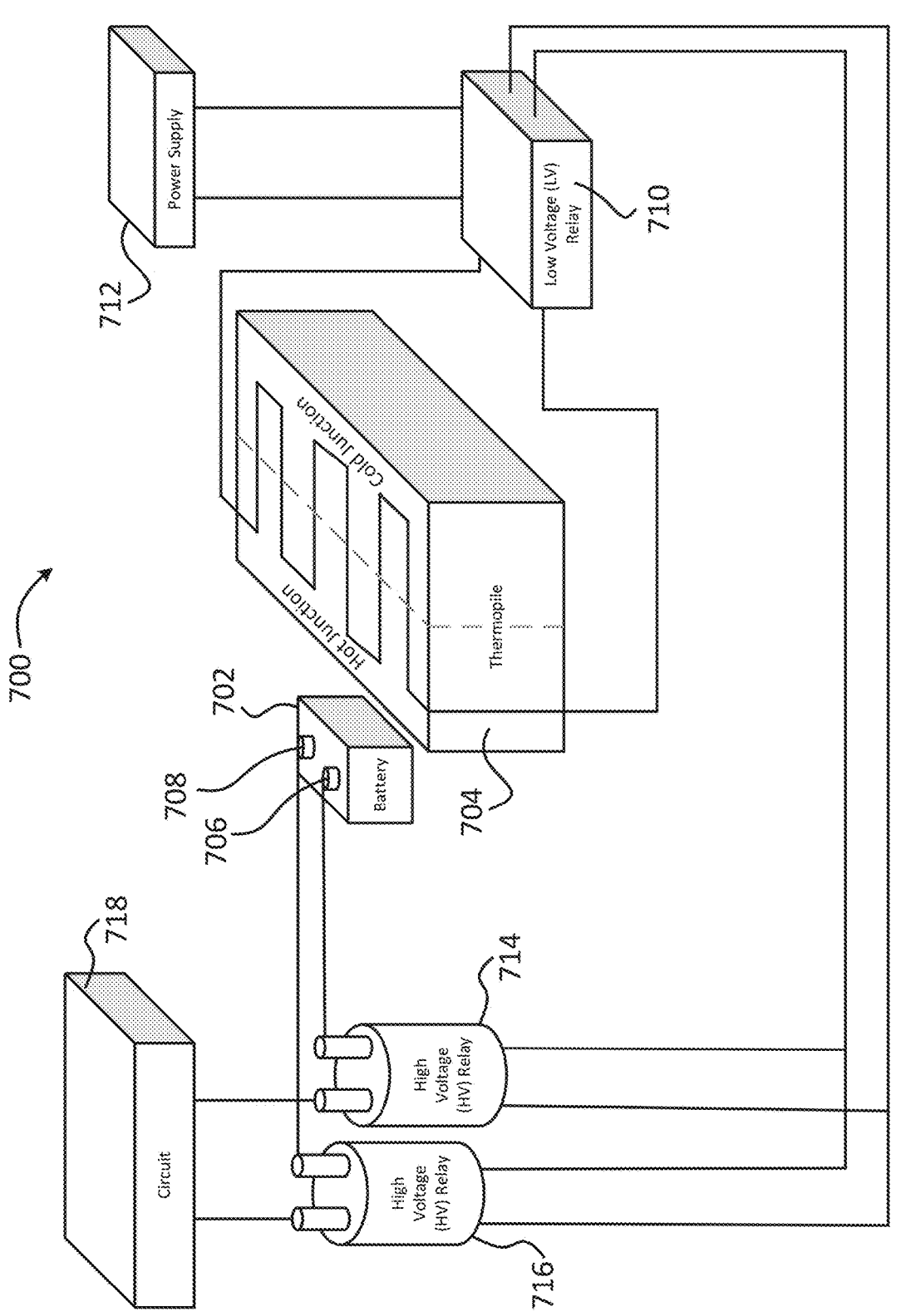
FIG. 7 shows a battery assembly for thermal runaway prevention, according to some embodiments.

FIG. 7 shows a battery assembly for thermal runaway prevention, according to some embodiments. Specifically, FIG. 7 shows a battery assembly 700. Battery assembly 700 may be any collection of a plurality of batteries or electrochemical cells. In some embodiments, battery assembly 700 may be a battery pack or a power bank configured to provide energy to an electric circuit or an electronic device.

As shown, battery assembly 700 may comprise a battery 702. In some embodiments, battery 702 may be a primary (e.g., "disposable") battery. For example, in some embodiments, battery 702 may be a(n) alkaline, zinc-carbon, zinc-chloride, or lithium battery. In some embodiments battery 702 may be secondary (e.g., "rechargeable") batteries. In some embodiments, battery 702 may be a lithium-ion, nickel metal hydride, silver oxide, or nickel-zinc battery. In some embodiments, battery 702 may be a AAAA, AAA, A, B, C, or D battery.

In some embodiments, battery 702 may have a voltage greater than or equal to 1, 2, 3, 4, 5, 10, 15, or 20 volts. In some embodiments battery 702 may have a voltage less than or equal to 1, 2, 3, 4, 5, 10, 15, or 20 volts.

In some embodiments, battery 702 may have a capacity of at least 0.01, 0.025, 0.050, 0.075, 0.1, 0.25, 0.5, 0.75, 1, 25, 50, 75, or 100 amp-hours. In some embodiments, battery 702 may have a capacity of no more than 0.01, 0.025, 0.050, 0.075, 0.1, 0.25, 0.5, 0.75, 1, 25, 50, 75, or 100 amp-hours.

In some embodiments, battery sizes of one or more of battery 702 and battery 704 may be greater than or equal to 10 kWh, 50 kWh, 100 kWh, 500 kWh, 1 MWh, 10 MWh, 50 MWh, or 100 MWh. In some embodiments, battery sizes of one or more of battery 702 and battery 704 may be less than or equal to 10 kWh, 50 kWh, 100 kWh, 500 kWh, 1 MWh, 10 MWh, 50 MWh, or 100 MWh. In some embodiments, one or more of battery 702 and battery 704 may be pouch batteries. In some embodiments, one or more of battery 702 and battery 704 may be prismatic batteries. In some embodiments, one or more of battery 702 and battery 704 may be cylindrical batteries.

In some embodiments, one or more of battery 702 and battery 704 may be a battery module comprising a plurality of electrochemical cells. In some embodiments, one or more of battery 702 and battery 704 may be a battery module configured to be mounted on a rack. In some embodiments, one or more of battery 702 and battery 704 may be a battery module tower. A battery module tower may be greater than or equal to 0.25, 0.5, 0.75, 1, 1.5, 2, 2.5, or 3 feet in one or more dimensions. A battery module tower may be less than or equal to 0.25, 0.5, 0.75, 1, 1.5, 2, 2.5, or 3 feet in one or more dimensions.

In some embodiments, battery assembly 700 may comprise a thermopile 704 that may be positioned near terminals 706 and 708 of battery 702. Thermopile 704 may comprise a plurality of thermocouples connected in series and may be configured to convert thermal energy into electrical energy. Specifically, when a temperature gradient is generated across thermopile 704, thermopile 704 may be configured to output a voltage.

Figure 8:
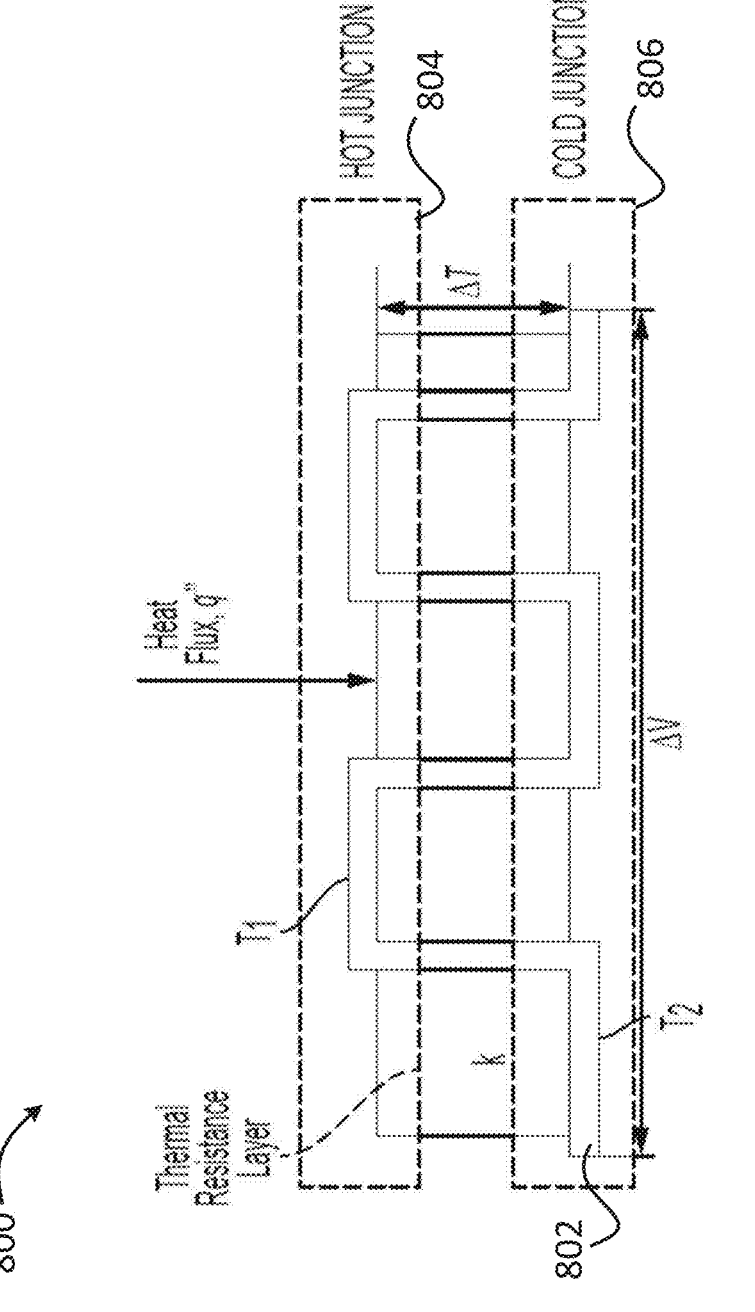
FIG. 8 illustrates an exemplary thermopile, according to some embodiments.

FIG. 8 illustrates an exemplary thermopile 800. As shown, thermopile 800 comprises a plurality of thermocouples 802 connected in series. Each thermocouple may comprise two different metals (e.g., iron and copper) connected in series. Thermopile 800 may comprise a hot junction 804 and a cold junction 806. When a temperature gradient is generated across hot junction 804 and cold junction 806, a voltage may be produced by thermopile 800 due to the Seebeck effect. The voltage produced by thermopile 800 may be proportional to the difference in temperature between hot junction 804 and cold junction 806. In some embodiments, thermopile 704 of battery assembly 700 shown in FIG. 7 may include one or more features of thermopile 800.

In some embodiments, thermopile 704 may be positioned such that the hot junction of thermopile 704 is proximate to terminals 706 and 708 of battery 702 and the cold junction of thermopile 704 is positioned distally from battery 702 with respect to the hot junction. Thermopile 704 may be electrically coupled to a low-voltage relay 710. In some embodiments, when a temperature at or near one or more of terminals 706 and 70 increases, a temperature gradient may be produced in thermopile 704 as the hot junction of thermopile 704 receives heat output by battery 702. As a result of the temperature gradient, thermopile 704 may output a voltage, which may trigger low-voltage relay 710. In some embodiments, low-voltage relay 710 may be receive power from a power supply 712.

In some embodiments, thermopile 704 may produce a voltage that triggers low-voltage relay 710 when a temperature gradient across the junctions of thermopile 704 exceeds a threshold temperature gradient. The threshold temperature gradient may be greater than or equal to 0.01, 0.03, 0.06, 0.09, 0.1, 0.3, 0.6, 0.9, 1, 3, 6, or 9° C./inch. In some embodiments, the threshold temperature gradient may be less than or equal to 0.01, 0.03, 0.06, 0.09, 0.1, 0.3, 0.6, 0.9, 1, 3, 6, or 9° C./inch.

Terminals 706 and 708 of battery 702 may be electrically coupled to a first high-voltage relay 714 and a second high-voltage relay 716, respectively. In some embodiments, first high-voltage relay 714 and second high-voltage relay 716 may be configured to control electrical coupling between battery 702 and a circuit 718. In some embodiments, circuit 718 may be a charging circuit for battery assembly 700. In some embodiments, low-voltage relay 710 may be electrically coupled to high-voltage relays 714 and 716. When thermopile 704 outputs a voltage to low-voltage relay 710, low-voltage relay 710 may cause one or more of high voltage relay 714 and high voltage relay 716 to open, thereby breaking the electrical coupling between terminal 706 and/or terminal 708 and circuit 718.

Any one or more characteristics of any of the embodiments (including claims) described, shown, and/or referenced herein may be combined, in whole or in part, with any one or more characteristics of any one or more other embodiments (including claims) described, shown, and/or referenced herein.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A battery assembly comprising:

a first battery comprising a first terminal;

a second battery comprising a second terminal;

a conductive connector comprising a first end and a second end, wherein the conductive connector electrically connects the first terminal to the second terminal;

a spring mechanically coupled to the conductive connector; and a sacrificial block, distinct from the electrical connector, disposed on a surface of the conductive connector, wherein the sacrificial block forces the spring into an energy-storing configuration, wherein, when the spring is forced into the energy-storing configuration, the first end of the conductive connector is electrically and physically coupled to the first terminal and the second end of the conductive connector is electrically and physically coupled to the second terminal;

wherein the sacrificial block is configured to melt when a battery assembly temperature exceeds a threshold temperature value such that, when the sacrificial block melts, the spring relaxes from the energy-storing configuration and mechanically displaces the conductive connector to break the electrical and physical coupling between the first end of the conductive connector and the first terminal and to break the electrical and physical coupling between the second end of the conductive connector and the second terminal.

2. The battery assembly of claim 1, wherein the first battery and the second battery are rechargeable.

3. The battery assembly of claim 1, wherein the spring is a helical spring.

4. The battery assembly of claim 3, wherein the energy-storing position is a compressed position.

5. The battery assembly of claim 1, wherein the spring is a torsion spring that is mechanically coupled to the conductive connector by an insulating shaft.

6. The battery assembly of claim 5, wherein the energy-storing position is a twisted position.

7. The battery assembly of claim 1, wherein the conductive connector comprises copper.

8. The battery assembly of claim 1, wherein the sacrificial block comprises a phase change material (PCM).

9. The battery assembly of claim 1, wherein the threshold temperature value is between 50° C. and 100° C.

10. The battery assembly of claim 1, wherein:

the first terminal of the first battery is electrically coupled to a first relay, and the first battery further comprises a third terminal electrically coupled to a second relay, the battery assembly further comprising:

a thermopile, wherein a hot junction of the thermopile is positioned proximate to the first battery and a cold junction of the thermopile is positioned distally from the first battery with respect to the hot junction and wherein the first relay and the second relay are electrically coupled to the thermopile;

wherein the thermopile and the first and second relays are configured such that, when a temperature gradient of the thermopile exceeds a threshold gradient value, the thermopile generates a voltage that causes one or both of the first and second relays to disconnect one or both of the first and third terminals from a circuit.

11. The battery assembly of claim 10, wherein the circuit is a charging circuit for the first battery.

12. The battery assembly of claim 10, wherein the thermopile comprises a thermoelectric cell comprising iron and copper.

13. The battery assembly of claim 10, wherein the threshold gradient value is less than or equal to 0.3° C./inch.

14. The battery assembly of claim 1, wherein:

the sacrificial block is aligned with the spring, and the disposing the sacrificial block on the surface and the aligning the sacrificial block with the spring force the spring into the energy-storing configuration.

* * * * *